United States Patent [19]
Longoria et al.

[11] Patent Number: 6,053,695
[45] Date of Patent: Apr. 25, 2000

[54] TORTILLA COUNTER-STACKER

[75] Inventors: Jose L. Longoria; Steven M. Kenison, both of Plainview, Tex.

[73] Assignee: ITE, Inc., Plainview, Tex.

[21] Appl. No.: 09/072,563

[22] Filed: May 5, 1998

Related U.S. Application Data

[60] Provisional application No. 60/067,127, Dec. 2, 1997.

[51] Int. Cl.[7] .................................................. B65G 57/00
[52] U.S. Cl. .................................... 414/790.8; 414/788.9; 414/789.9; 414/793.4; 414/901
[58] Field of Search ................................ 414/788.9, 789, 414/789.1, 789.9, 790.5, 790.6, 790.8, 793.4, 794.2, 794.4, 901; 271/146

[56] References Cited

U.S. PATENT DOCUMENTS

| | | | |
|---|---|---|---|
| 3,366,253 | 1/1968 | Walchhuter | 414/901 |
| 3,842,698 | 10/1974 | Fitch et al. | 414/790.8 |
| 3,915,317 | 10/1975 | White et al. | 414/790.8 |
| 4,006,831 | 2/1977 | Jimenez | 414/789 |
| 4,054,015 | 10/1977 | Rowell | 53/26 |
| 4,311,475 | 1/1982 | Imai | 414/901 |
| 4,405,186 | 9/1983 | Sandberg et al. | 414/790.8 |
| 4,530,632 | 7/1985 | Sela | 414/901 |
| 4,760,777 | 8/1988 | Welsh | 99/450.1 |
| 4,934,687 | 6/1990 | Hayden et al. | 414/789.9 |
| 5,244,342 | 9/1993 | De Dompierre | 414/790.8 |
| 5,253,762 | 10/1993 | Duncan | 414/794.4 |
| 5,531,156 | 7/1996 | Brummett | 99/450.1 |
| 5,601,397 | 2/1997 | Lopez et al. | 414/790.7 |
| 5,720,593 | 2/1998 | Pleake | 414/789.9 |

*Primary Examiner*—Douglas Hess
*Attorney, Agent, or Firm*—Daniel V. Thompson

[57] ABSTRACT

A tortilla counter-stacker (10) having a canister (12) which has a canister side (12C) having a horizontal canister side slot (12CA) disposed therein. A stacker (16) is positioned adjacent to the canister (12). The stacker (16) has a stacker cylinder (16A) having a movable stacker cylinder piston (16AA) attached at a front distal end to a rear distal end of a horizontal stacker cylinder piston plate (16AAA) which inserts and retracts through the canister side slot (12CA). A lift (18) is positioned directly below the canister (12). The lift (18) has a lift cylinder (18A) having a lift cylinder piston (18AA) movably positioned therein. The lift cylinder piston (18AA) has a horizontal lift cylinder piston plate (18AAA) securely attached to a top distal end thereof. An upper conveyor (20) is horizontally positioned in alignment with the canister top (12T). The upper conveyor (20) has a rotatable upper conveyor belt (20A) upon which incoming tortillas (28C) are placed. A lower conveyor (22) is positioned between the lift (18) and the canister (12). The lower conveyor (22) has a lower conveyor left belt (22AL) and a lower conveyor right belt (22AR) synchronically rotatably about the lift (18). A photoelectric eye (24) and counter (26) are electrically connected thereto.

8 Claims, 6 Drawing Sheets

6,053,695

TORTILLA COUNTER-STACKER

CROSS REFERENCE TO RELATED APPLICATIONS

This application claims benefit of the provisional patent application Ser. No. 60/067,127 filed on Dec. 2, 1997 titled Tortilla Counter-Stacker.

TECHNICAL FIELD

This invention is related to food handling, apparatus, and more particularly to an improved device for counting and stacking thin, flexible food items such as tortillas.

BACKGROUND ART

The state of the art in tortilla counter-stackers is the counter-stacker manufactured by Arr-Tech Mfg., Inc. This device suffers from a severe drawback, in that the tortillas stacked by this device are not coaxially aligned, resulting in stacks having ragged edges like a deck of cards immediately after shuffling. Also like a deck of cards, the stacks of tortillas have to be manually tapped on the sides to obtain a smooth-sided cylindrical stack. In an industry where the production of tortillas is almost totally automated, this manual stack-aligning step adds substantial labor cost. It is estimated that for tortillas only 20% of the cost is in the product and 80% is in the labor-intensive packaging process. Automated stack-aligning would eliminate a half to two-thirds of the labor involved in packaging.

Numerous innovations for Tortilla Counter-Stackers have been provided in the prior art that are described as follows. Even though these innovations may be suitable for the specific individual purposes to which they address, they differ from the present invention as hereinafter contrasted.

In U.S. Pat. No. 4,760,777, titled Tortilla Stacker, invented by Richard S. Welsh, an apparatus for stacking tortillas includes a loading unit in the form of a trough-like loading conveyor for transporting a series of dough members while forming a small depression in each of the dough members. A container in the form of an upright hollow cylinder having a retractable loading surface is positioned at the discharge end of the loading conveyor. The tortillas are stacked one-on-top-of-the-other on the retractable loading surface by the loading conveyor. A conveyor located beneath the container receives the stack of tortillas upon retraction of the loading surface. A counter on an inclined chute leading to the conveyor accurately counts the number of tortillas entering the container.

In U.S. Pat. No. 4,006,831, titled Automatic Tortilla Counter and Stacker, invented by James A. Jimenez, a method of stacking articles and an automatically controlled apparatus for successively receiving articles formed of rigid or semirigid sheet material such as cooked or partially cooked tortillas or similar food products, automatically formed orderly stacks of a predetermined number of articles, and then automatically carrying away for packaging each stack when completed.

In U.S. Pat. No. 4,530,632, titled Stacking Apparatus for Flexible, Generally Planar Food Products, invented by Richard Sela, an apparatus for counting and stacking food products such as tortillas. The tortillas are initially placed on an entry chute containing a large number of air outlets for creating a cushion of air to allow the tortilla to slide down the entry chute onto an incline conveyor belt. The conveyor belt is of an open mesh design and it is supported on a belt support having a large number of air inlets which create a vacuum that maintains the tortilla in contact with the belt. The tortillas are carried by the belt down one end of the belt support and along the underside of the belt support with contact between the tortilla and belt being maintained by vacuum creating air inlets formed in the belt support. The air inlets terminate at a location on the underside of the belt support thereby allowing the tortillas to drop from the conveyor belt. The tortillas drop onto a stationary rack formed by rods which are interleaved with conveyor belts moving together as a unit. The conveyor belts are normally positioned beneath the upper surface of the rack. However, when a predetermined number of tortillas have been stacked, the belt is lifted thereby carrying the tortillas from the rack. The mechanism for lifting the belts is actuated by a counter which counts a predetermined number of tortillas passing past a counting station and delays actuating the belt lifting mechanism until the final tortilla has dropped onto the rack. The belts discharging the stacks of tortillas move in the direction opposite the direction that the tortillas are delivered to the rack in order to minimize the time required to remove the tortillas from the rack before an additional tortilla may be placed thereon.

In U.S. Pat. No. 5,720,593, titled Apparatus and Method of Counting, Inspecting and Stacking Planar Food Products, invented by Todd B. Pleake, an apparatus for counting, inspecting, and stacking flexible, generally planar food products such as tortillas, or the like. The apparatus has an inclined infeed conveyor with adjustable alignment guides thereon to adjust the lateral position of each tortilla as it moves to a transit conveyor. Sensors mounted on the transit conveyor count the tortillas and inspect the size and shape of the tortillas to detect any defective tortillas moving along the transit conveyor. At the end of the transit conveyor, an arcuate-shaped trajectory guide bends the tortilla into an arcuate shape as the tortilla leaves the trajectory guide and flies through a known flight trajectory to a stacking mechanism. The arcuate shape allows the leading edge of the tortilla to resist bending or folding. A rejection mechanism positioned between the end of the transit conveyor and the trajectory guide redirects any rejected tortillas detected by the sensors downward away from the trajectory guide. A stacking mechanism receives the tortillas at the end of the flight trajectory. A shaker shakes the stacking mechanism and jostles the stack of tortillas to form a tight, aligned stack. A movable stack plate supports the stack of tortillas in the stacking mechanism and moves downward incrementally as tortillas are stacked into the stacking mechanism so the flight trajectory of each tortilla is approximately the same. The stacking plate has a lowered position that deposits a stack of tortillas on a baseplate, and a stack removal device moves the stack of tortillas away from the stacking assembly to a discharge conveyor.

In U.S. Pat. No. 5,253,762, titled Stacking, Counting and Sorting Device for Flexible, Planar Food Products, invented by Daryl G. Duncan, a device for counting, inspecting, sorting, and stacking planar food products such as tortillas. The tortillas are sandwiched between a pair of conveyor belts moving at the same speed to a discharge location between a pair of rollers around which the respective conveyor belts extend. The speed of the tortillas causes them to be flung from between the rollers onto a discharge tray. A counter determines when a predetermined number of tortillas have been discharged onto the discharge tray. The counter then triggers an actuator to remove the tray from beneath the stack of tortillas, thereby allowing them to fall onto a discharge conveyor belt. The discharge conveyor belt is then moved an incremental distance. The tortillas passing through the device are scanned in order to detect defective tortillas. When a defective tortilla is found, one of the rollers at the discharge location is shifted, thereby altering the path of the tortillas flung from the conveyor belts at the discharge location onto a reject discharge conveyor belt.

In U.S. Pat. No. 5,601,397, titled Apparatus for Counting and Stacking Tortillas, invented by Manuel Lopez and Rafael Lopez, an apparatus having a series of conveyor belts for flattening and stacking a plurality of flexible, generally planar articles, such as tortillas. The apparatus includes a first conveyor belt extending along first end, upper, second end and lower surfaces of a belt support. The conveyor belt is adapted to move the planar articles placed on the upper surface of the belt support from the first end to the second end. A second conveyor belt is biased against the first belt at the second end of the belt support for applying compressive and lateral forces to the planar articles as they are moved along the second end of the belt support. A third conveyor belt is located beneath the first and second conveyor belts for receiving the planar articles from the first belt, forming stacks of them, and then discharging the stacked planar articles. Motor assemblies drive the first, second, and third conveyor belts.

In U.S. Pat. No. 4,054,015, titled Chip Packing Apparatus and Method, invented by Lorne A. Rowell, invented by Lorne A. Rowell, an apparatus for stacking food chips in a cylindrical container. Random chips are oriented into tandem alignment on an inclined conveyor traveling in an upward direction and are deposited into an upright cylindrical stacking tube above a station for the empty cylindrical containers. A valve comprising operatively associated upper and lower blades in the stacking tube load vertical stacks of chips into the cylindrical containers.

In U.S. Pat. No. 3,915,316, titled Counting and stacking Apparatus, invented by Johnny B. Pomara, Jr., apparatus for counting and stacking substantially flat articles, such, particularly, as food articles of the nature of Mexican tortillas, which includes a first belt type feed conveyor, a second belt type stacking conveyor intermeshing with a vertically movable stacking rack or fork, and a take-away conveyor. The articles are sequentially fed from a conventional conveyor from apparatus such as an oven to the feed conveyor beneath a counting switch. Each article is discharged from the feed conveyor in a stacked relationship to the stacking conveyor against the stacking rack. When the desired number of articles are stacked on the stacking conveyor against the rack, the rack rapidly retracts downwardly releasing the stack for discharge to the take-away conveyor. Between the time of discharge of each stack and the arrival of the first article for forming the next stack, the stacking rack returns upwardly to intermeshed relationship with the stacking conveyor for forming and holding the next stack.

The above patented inventions differ from the present invention because they fail to describe or claim at least one combination of the following features depicted in the present invention: canister with canister sleeve, vibrator, stacker, lift, upper conveyor, lower conveyor, photoelectric eye, and counter.

SUMMARY OF THE INVENTION

This invention provides an improved tortilla counter-stacker where tortillas are evenly stacked and the stacks are transported to a bagging station substantially ready to be bagged. The present invention describes and claims novel elements such as a sequenced elevator, lift, stacker, vibrating canister and conical canister sleeve which are an improvement of the art making the invention more commercially viable.

The types of problems encountered in the prior art are incoming tortillas stick to the inner sides of a canister.

In the prior art, unsuccessful attempts to solve this problem were attempted namely: smoother non-stick surfaces. However, the problem was solved by the present invention because of the vibrating canister and conical canister sleeve.

Innovations within the prior art are rapidly being exploited in the field of automated food preparation.

The present invention went contrary to the teaching of the art which teaches semi-automated tortilla manufacturing.

The present invention solved a long felt need for a fully automated tortilla manufacturing apparatus.

The present invention produced unexpected results namely: the tortillas were less damaged and therefor had a lower waste rate.

A synergistic effect was produced utilizing the present invention due to the following facts and results from experimentation: the cost of bagging was reduced due to the more evenly stacked tortillas.

Accordingly, it is an object of the present invention to provide a tortilla counter-stacker having a canister, a vibrator, a stacker, a lift, an upper conveyor, a lower conveyor, a photoelectric eye, and a counter.

In keeping with these objects, and with others which will become apparent hereinafter, one feature of the present invention resides, briefly stated, in the canister top having a canister top shroud which has a canister top shroud left flair and a canister top shroud right flair.

When the canister bottom is designed in accordance with the present invention, it contains a canister bottom extender and a canister bottom vent.

In accordance with another feature of the present invention, the canister side has a horizontal canister side slot.

Another feature of the present invention is that the vibrator has a vibrator arm.

Yet another feature of the present invention is that stacker has a stacker cylinder, a stacker power means, and a stacker controller.

Still another feature of the present invention is that stacker cylinder has a stacker cylinder piston which has a stacker cylinder piston plate attached thereto.

Yet still another feature of the present invention is that the stacker power means has a stacker power means inlet, a stacker power means egress, and a stacker power means connector.

Still yet another feature of the present invention is that the lift has a lift cylinder, a lift power means, a lift first controller, a lift second controller, a lift third controller, and a lift valve.

Another feature of the present invention is that the upper conveyor has an upper conveyor belt.

Yet another feature of the present invention is that the lower conveyor has a lower conveyor left belt, a lower conveyor right belt, and a lower conveyor middle belt.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—tortilla counter-stacker (10)
12—canister (12)
12A—canister sleeve (12A)
12T—canister top (12T)
12TA—canister top shroud (12TA)
12TAL—canister top shroud left flair (12TAL)
12TAR—canister top shroud right flair (12TAR)
12B—canister bottom (12B)
12BA—canister bottom extender (12BA)
12BB—canister bottom vent (12BB)
12C—canister side (12C)
12CA—canister side slot (12CA)
14—vibrator (14)
14A—vibrator arm (14A)
16—stacker (16)
16A—stacker cylinder (16A)
16AA—stacker cylinder piston (16AA)
16AAA—stacker cylinder piston plate (16AAA)
16B—stacker power means (16B)
16BA—stacker power means inlet (16BA)
16BB—stacker power means egress (16BB)
16BC—stacker power means connector (16BC)
16C—stacker controller (16C)
18-lift (18)
18A—lift cylinder (18A)
18AA—lift cylinder piston (18AA)
18AAA—lift cylinder piston plate (18AAA)
18B—lift power means (18B)
18BA—lift power means inlet (18BA)
18BB—lift power means egress (18BB)
18BC—lift power means connector (18BC)
18C—lift first controller (18C)
18D—lift second controller (18D)
18E—lift third controller (18E)
18F—lift valve (18F)
20—upper conveyor (20)
20A—upper conveyor belt (20A)
22—lower conveyor (22)
22AL—lower conveyor left belt (22AL)
22AR—lower conveyor right belt (22AR)
22AM—lower conveyor middle belt (22AM)
24—photoelectric eye (24)
26—counter (26)
28—tortilla (28)
28A—tortilla first stack (28A)
28B—tortilla second stack (28B)
28C—incoming tortilla (28C)
30—arrows (30)

DESCRIPTION OF THE PREFERRED EMBODIMENT

Figure 1:
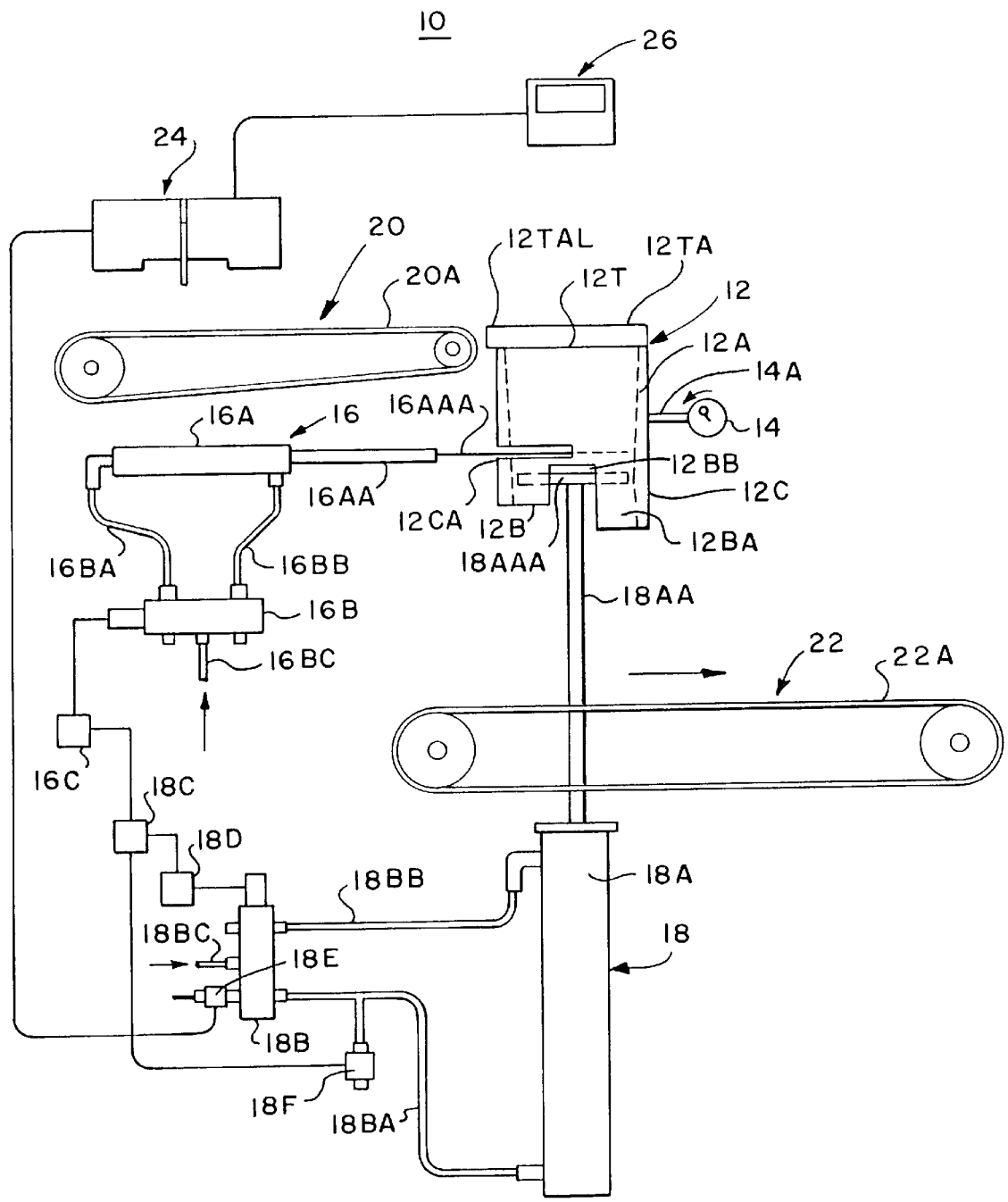
FIG. 1 is a schematic view of a tortilla counter-stacker (10) exhibiting a lift cylinder piston (18AA) and stacker cylinder piston (16AA) in extended positions.

Referring initially to FIG. 1, the novel elements of our counter-stacker are the tapered canister (12), the lift cylinder piston (18AA), and the stacker cylinder piston (16AA). For example, for corn tortillas 6.0 to 6.125 inches in diameter, the canister (12) is 5.0 inches tall, and has an inner frustroconical canister sleeve (12A) having a diameter of 6.5 inches at the top and 6.25 inches at the bottom. A pneumatic eccentric vibrator (14) is provided to "jiggle" down any misaligned tortillas that otherwise might have a tendency to stick, fold in, or jam the canister. Stacker cylinder piston plate (16AAA) extends through a canister side slot (12CA) in the side of canister (12). Stacker cylinder piston plate (16AAA) is a thin sheet-like member, with parallel linear sides and a rounded end complimentary to the radius of the canister sleeve (12A). Stacker cylinder piston plate (16AAA) is sized slightly smaller than the diameter of inner canister sleeve (12A) at canister side slot (12CA). The stacker (16) and lift (18) are pneumatically actuated in a precise sequence, as will be described below in connection with FIGS. 2a–2d. The remaining elements in FIG. 1 are conventional tortilla bakery equipment items familiar to those skilled in the art, such as the photoelectric eye (24), upper conveyor (20), lower conveyor (22), lift valve (18F), stacker controller (16C), lift first controller (18C), lift second controller (18D), and lift third controller (18E) which are basically timers familiar to those skilled in the art.

Figure 2A:
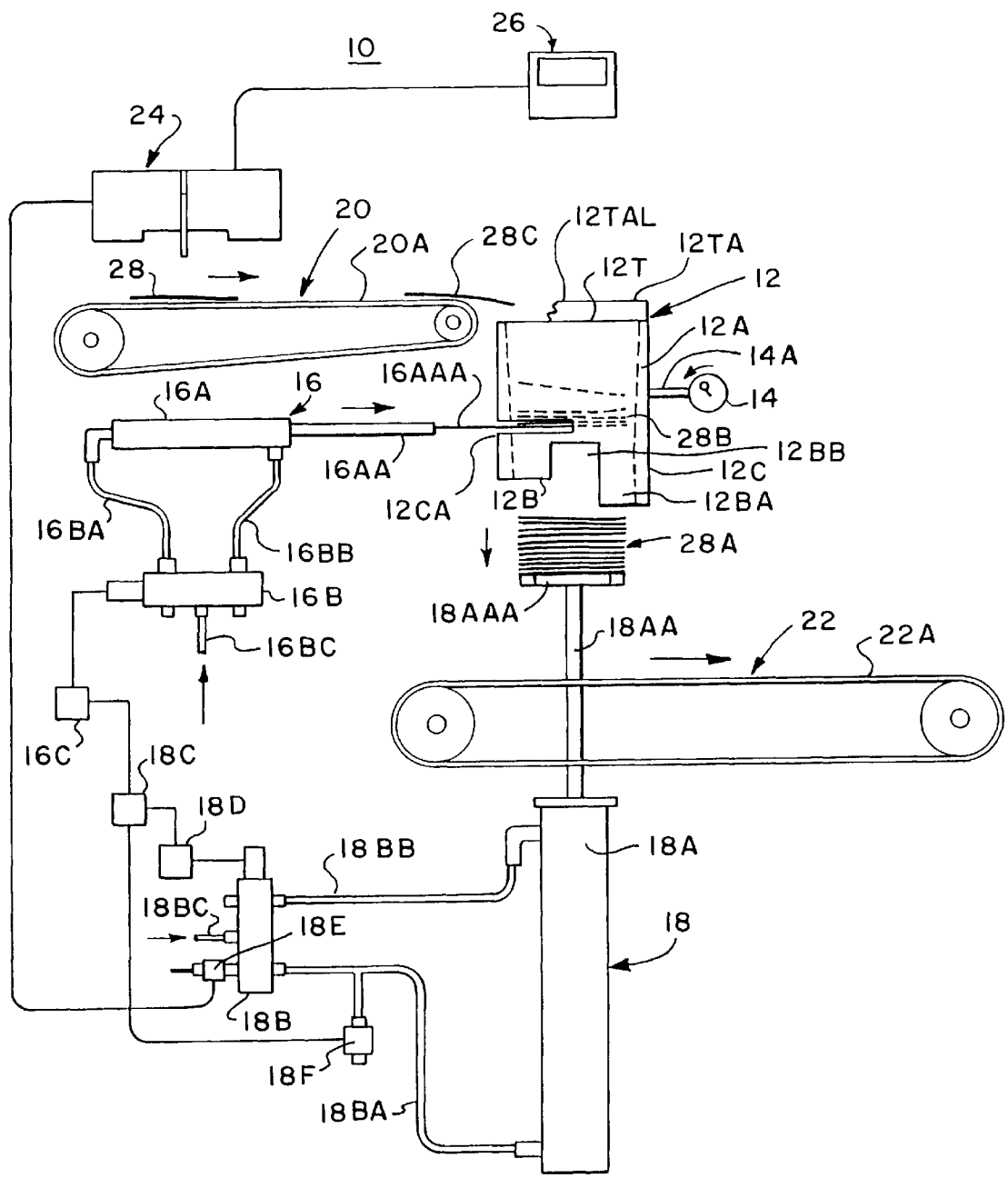
FIG. 2a is a schematic view of a tortilla counter-stacker (10) exhibiting a lift cylinder piston (18AA) with stacker cylinder piston plate (16AAA) containing a tortilla first stack (28A) in a retracting position and stacker cylinder piston (16AA) in an extended position having an incoming tortilla (28C) forming a tortilla second stack (28B).

In FIG. 2a, a finished stack of tortillas, tortilla first stack (28A), has a preselected number of tortillas all in an even-sided stack, ready for bagging. The tortilla first stack (28A) is being lowered on lift cylinder piston plate (18AAA) attached to lift cylinder piston (18AA) to a lower conveyor (22). Lower lower conveyor (22) terminates at a bagging station. Meanwhile, stacker cylinder piston (16AA) has been extended to its fully-extended position, where lift cylinder piston plate (18AAA) serves to catch the constant flow of incoming tortillas (28C) while lift cylinder piston (18AA) is sequenced. The flow of incoming tortilla (28C) is never interrupted. The elevator sequence is initiated when tortilla first stack (28A) is completed, i.e., has the requisite number of units as determined by the photoelectric eye (24) and counter (26). While lift cylinder piston (18AA) sequences, lift cylinder piston plate (18AAA) serves as a temporary floor for the building new tortilla second stack (28B).

Figure 2B:
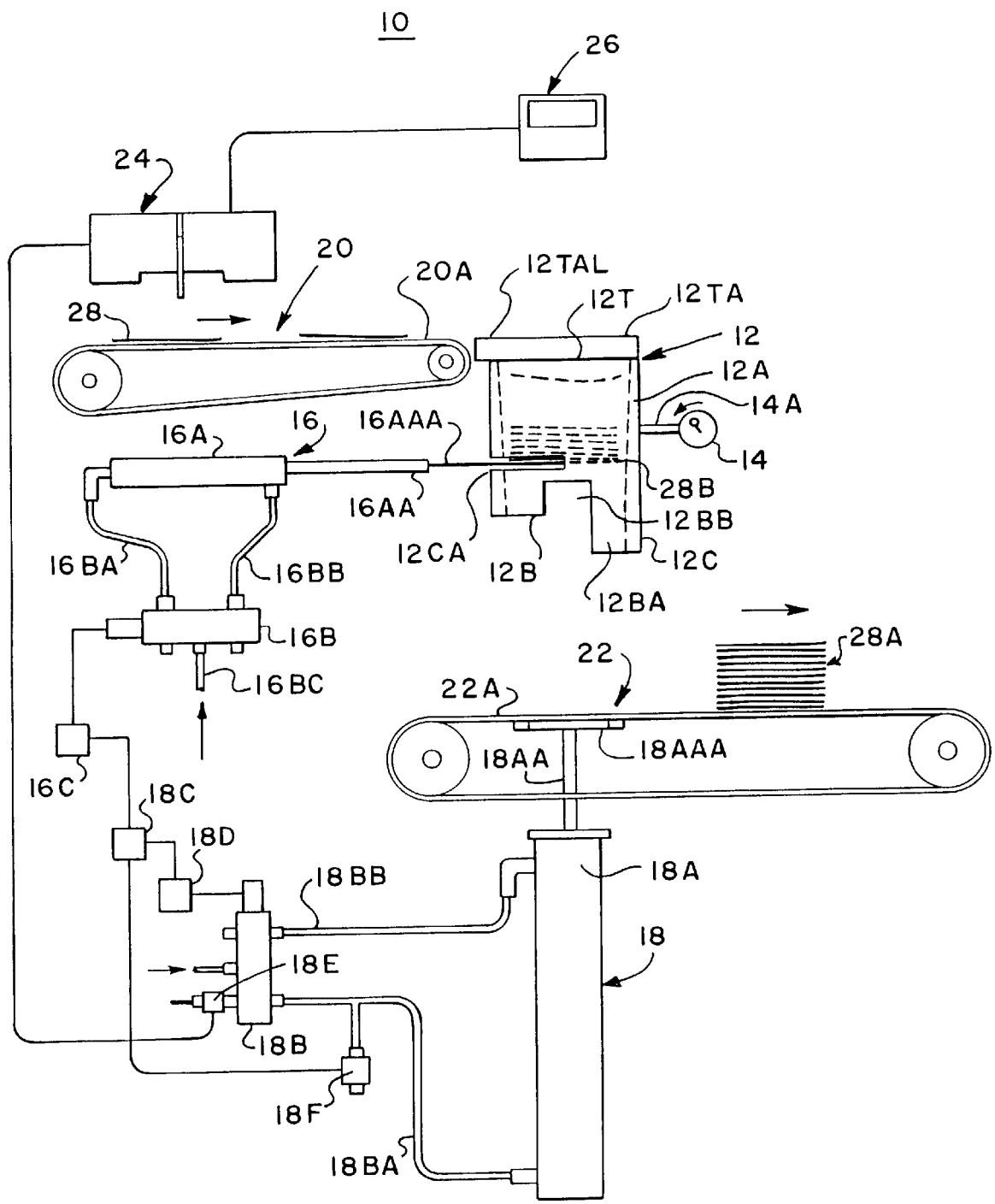
FIG. 2b is a schematic view of a tortilla counter-stacker (10) exhibiting a lift cylinder piston (18AA) with stacker cylinder piston plate (16AAA) in a fully retracted position after tortilla first stack (28A) was placed upon lower conveyor (22) and stacker cylinder piston (16AA) in an extended position having an incoming tortilla (28C) falling on tortilla second stack (28B).

In FIG. 2b, lift cylinder piston plate (18AAA) has descended to a position where it has transferred tortilla first stack (28A) to lower conveyor (22). Meanwhile, new tortilla second stack (28B) continues to build on stacker cylinder piston (16AA).

Figure 2C:
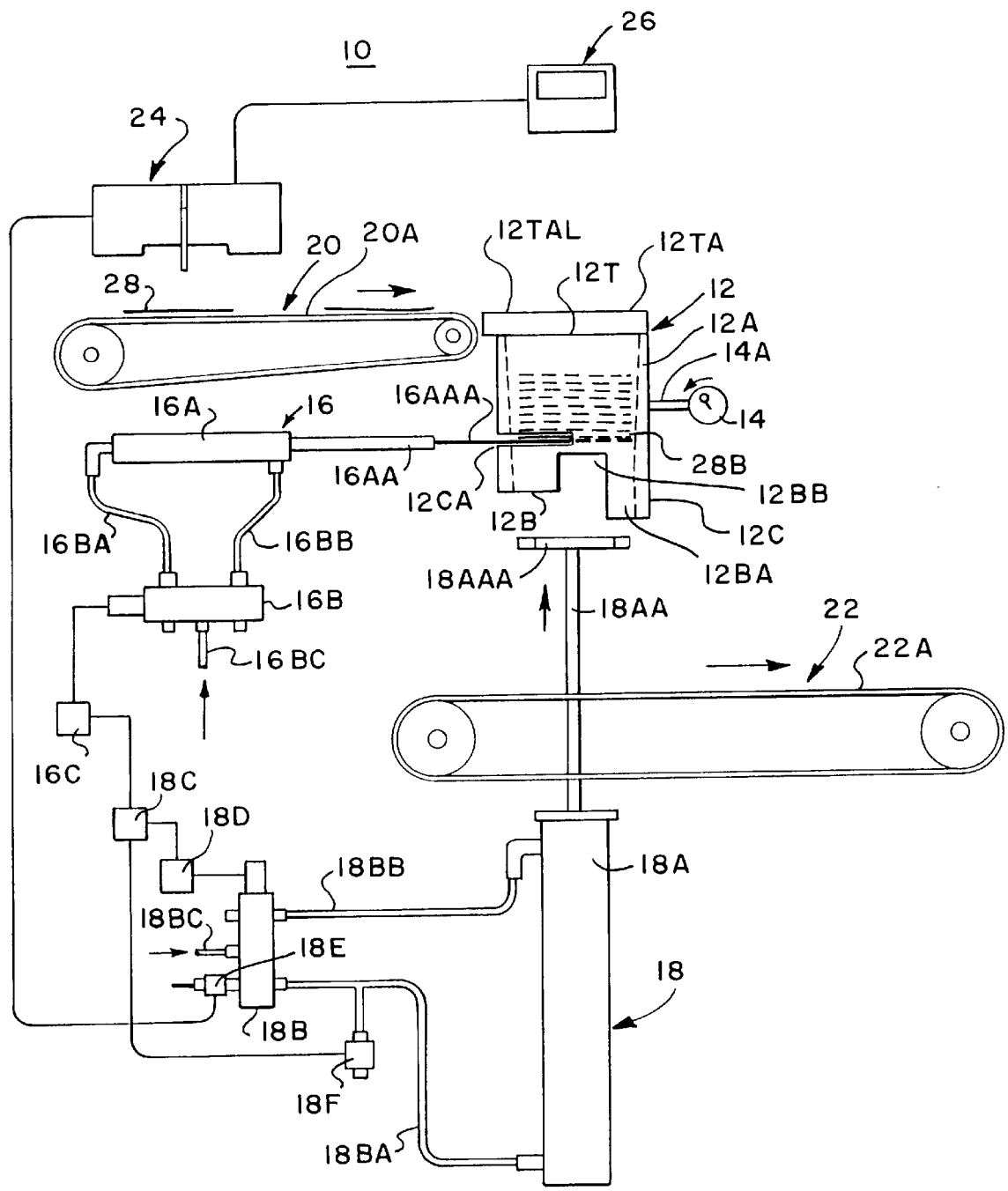
FIG. 2c is a schematic view of a tortilla counter-stacker (10) exhibiting a lift cylinder piston (18AA) with stacker cylinder piston plate (16AAA) in an extending position and stacker cylinder piston (16AA) in an extended position having an incoming tortilla (28C) falling on tortilla second stack (28B).

In FIG. 2c, lift cylinder piston (18AA) continues its sequence by traveling upwards. Meanwhile, new tortilla second stack (28B) continues to build on lift cylinder piston plate (18AAA).

Figure 2D:
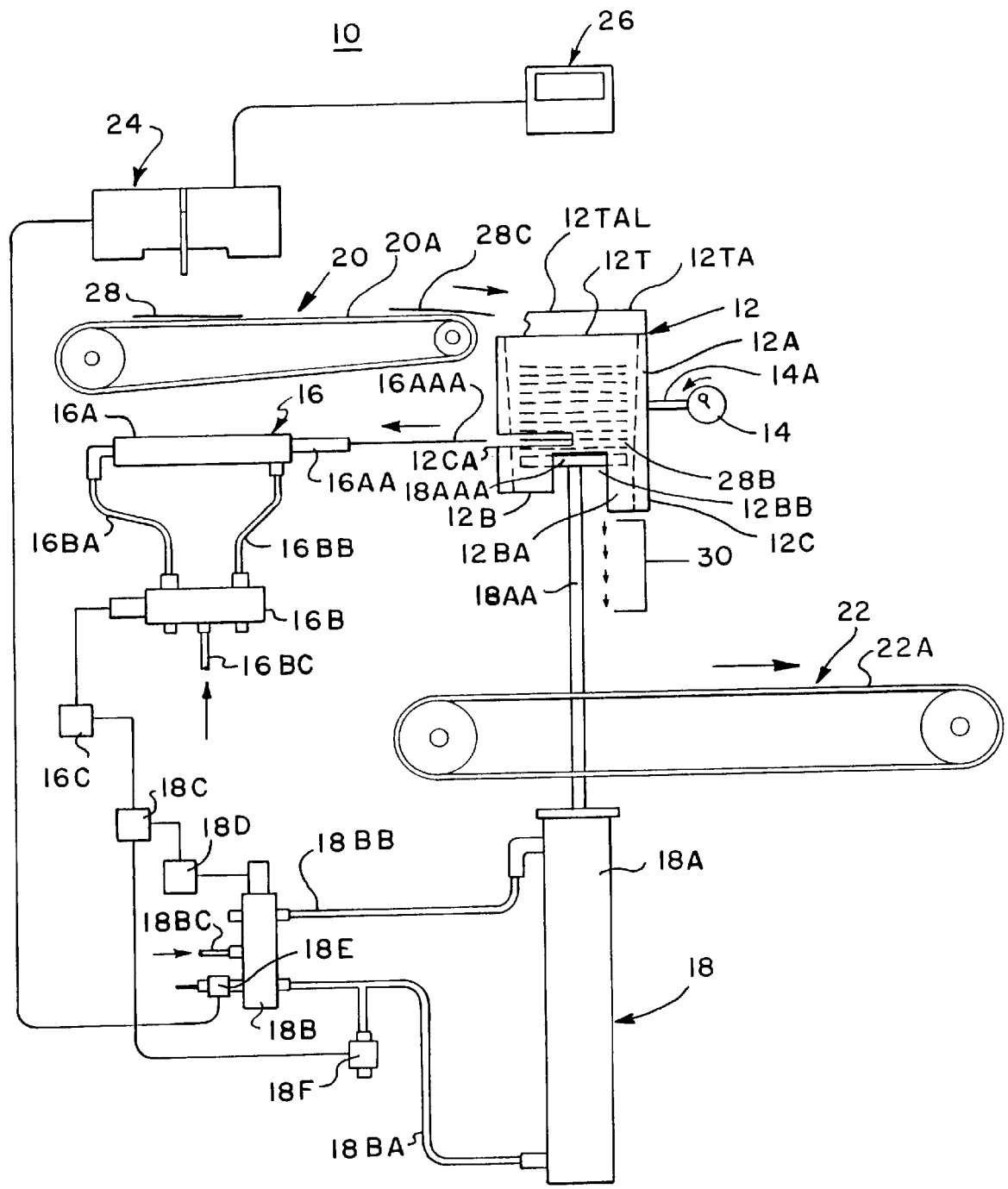
FIG. 2d is a schematic view of a tortilla counter-stacker (10) exhibiting a lift cylinder piston (18AA) with stacker cylinder piston plate (16AAA) in an incremental retracting position and stacker cylinder piston (16AA) in a retracting position placing second stack (28B) on top of stacker cylinder piston plate (16AAA).

Finally, in FIG. 2d, lift cylinder piston (18AA) has returned to the position shown in FIG. 1, where lift cylinder piston plate (18AAA) once again serves as the floor for new tortilla second stack (28B). Stacker cylinder piston (16AA) has been retracted. To maintain a relatively constant elevation of the top of tortilla second stack (28B), release lift valve (18F) is intermittently actuated to lower lift cylinder piston (18AA) in relatively small amounts, as schematically illustrated by arrows (30). When tortilla second stack (28B) reaches its predetermined quantity of units, the sequence is repeated, where lift cylinder piston (18AA) with lift cylinder piston plate (18AAA) lowers and stacker cylinder piston (16AA) with stacker cylinder piston plate (16AAA) extends, as shown in FIG. 2a.

Figure 3:
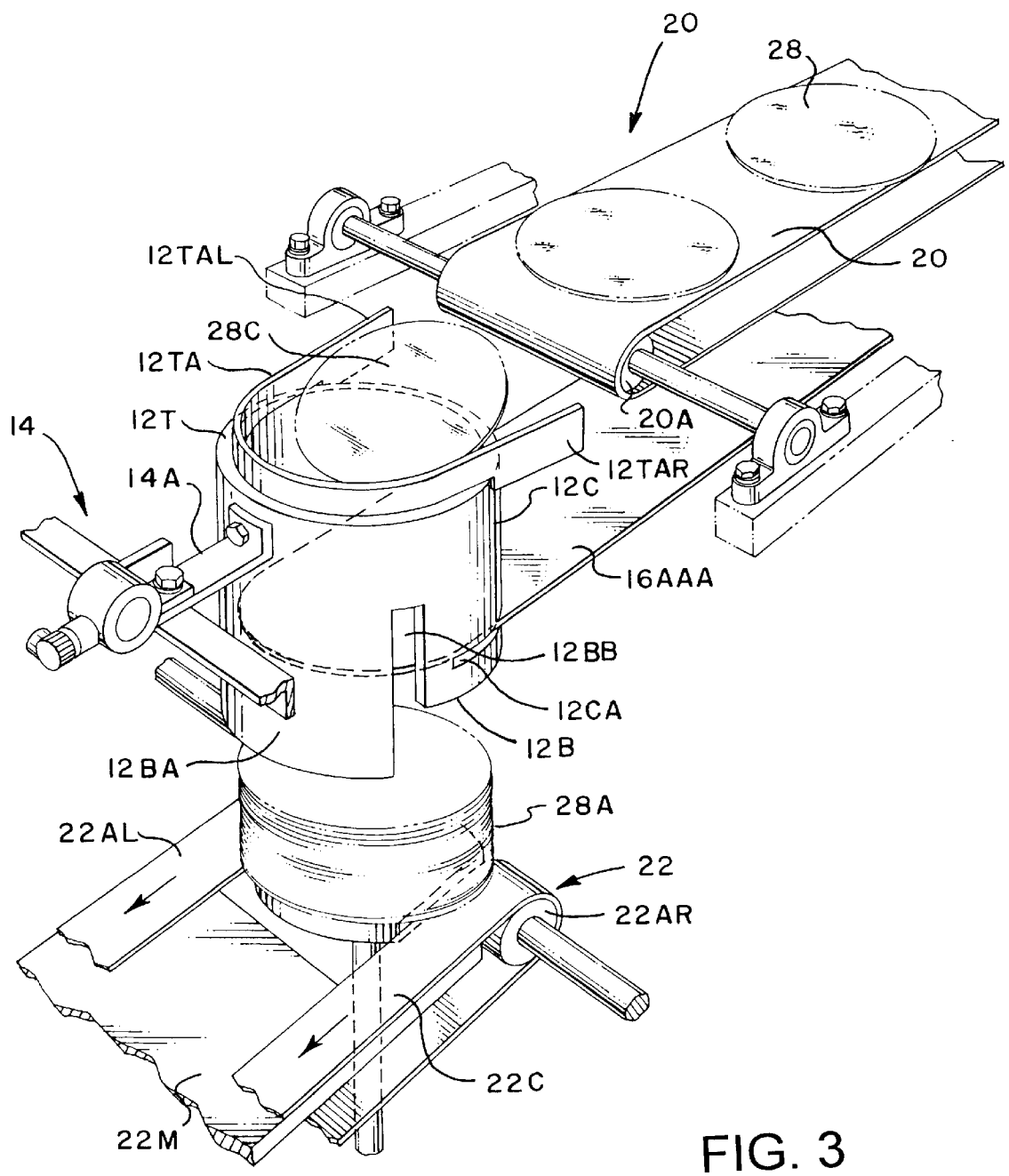
FIG. 3 is a perspective view of a tortilla counter-stacker (10) constructed in accordance with the invention.

Referring now to FIG. 3 in conjunction with the other FIGURES, tortilla counter-stacker (10) has a canister (12), which includes a canister top (12T), a canister bottom (12B), and a canister side (12C) having a horizontal canister side slot (12CA) disposed therein. A stacker (16) is positioned adjacent to the canister (12), and the stacker (16) comprises a stacker cylinder (16A) having a movable stacker cylinder piston (16AA) attached at a front distal end to a rear distal end of a horizontal stacker cylinder piston plate (16AAA) which inserts and retracts through the canister side slot (12CA). The stacker (16) further includes a stacker power means (16B). The stacker power means (16B) includes a stacker power means inlet (16BA) and a stacker power means egress (16BB) attached to and in communication with a lower and upper ends, respectively, of the stacker cylinder (16A). The stacker power means (16B) further includes a stacker power means connector (16BC) which is powered by hydraulic or pneumatic means. The stacker power means (16B) is connected to and controlled by a stacker controller (16C).

A lift (18) is positioned directly below the canister (12). The lift (18) includes a lift cylinder (18A) having a lift cylinder piston (18AA) movably positioned therein. The lift cylinder piston (18AA) includes a horizontal lift cylinder piston plate (18AAA) securely attached to a top distal end thereof. The lift (18) further includes a lift power means (18B). The lift power means (18B) includes a lift power means inlet (18BA) having a lift valve (18F) and a lift power means egress (18BB) attached to and in communication with a lower and upper ends, respectively, of the lift cylinder (18A). The lift power means (18B) further includes a lift power means connector (18BC) which is powered by hydraulic or pneumatic means. The lift power means (18B) is connected to and controlled by a lift second controller (18D) which is electrically connected to a lift first controller (18C) which is electrically connected to the stacker controller (16C). The lift power means (18B) further includes a lift third controller (18E) attached thereto. The lift valve (18F) is electrically connected to the lift first controller (18C).

An upper conveyor (20) is horizontally positioned in alignment with the canister top (12T). The upper conveyor (20) includes a rotatable upper conveyor belt (20A) upon which incoming tortillas (28C) are placed.

A lower conveyor (22) is positioned between the lift (18) and the canister (12). The lower conveyor (22) includes a lower conveyor left belt (22AL) and a lower conveyor right belt (22AR) synchronically rotated. The space between the lower conveyor left belt (22AL) and the lower conveyor right belt (22AR) is slightly larger than the diameter of the lift cylinder piston plate (18AAA) which deposits a tortilla first stack (28A) on lower conveyor left belt (22AL) and a lower conveyor right belt (22AR).

A photoelectric eye (24) is electrically connected to the lift third controller (18E), and a counter (26) electrically connected to the photoelectric eye (24).

The canister (12) further includes a canister sleeve (12A) securely mounted therein, and the canister sleeve (12A) includes a diameter slightly bigger than a diameter of an incoming tortilla (28C). The canister top (12T) further includes a canister top shroud (12TA) having an opening facing the upper conveyor (20). The canister top shroud (12TA) functions to facilitate directing the incoming tortilla (28C) into the canister (12) which rest upon the lift cylinder piston plate (18AAA) forming a tortilla second stack (28B).

The canister top shroud (12TA) includes a canister top shroud left flair (12TAL) and a canister top shroud right flair (12TAR) positioned at opposite ends. The canister top shroud left flair (12TAL) and the canister top shroud right flair (12TAR) function to facilitate directing the incoming tortilla (28C) into the canister (12).

The canister bottom (12B) includes a canister bottom extender (12BA) positioned at an opposite side to the movable direction of the lower conveyor (22). The canister bottom extender (12BA) functions to facilitate directing the tortilla first stack (28A) onto the lower conveyor left belt (22AL) and the lower conveyor right belt (22AR).

The canister bottom (12B) further includes canister bottom vent (12BB) extending upwardly therefrom. The canister bottom vent (12BB) functions to facilitate directing the tortilla first stack (28A) onto the lower conveyor left belt (22AL) and the lower conveyor right belt (22AR).

A vibrator (14) is attached to the canister side (12C) by a vibrator arm (14A). The vibrator (14) functions to jiggle the canister (12) directing the incoming tortilla (28C) to properly position on top of the tortilla second stack (28B).

The canister sleeve (12A) includes a conical configuration narrowing toward a bottom thereof.

Whereas, the present invention has been described with respect to a specific embodiment thereof, it will be understood that various changes and modifications will be suggested to one skilled in the art, and it is intended to encompass such changes and modifications as fall within the scope of the appended claim.

It will be understood that each of the elements described above, or two or more together, may also find a useful application in other types of constructions differing from the type described above.

While the invention has been illustrated and described as embodied in a Tortilla Counter-Stacker, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A tortilla counter-stacker (10) comprising:

A) a canister (12) which comprises a canister top (12T), a canister bottom (12B), and a canister side (12C) having a horizontal canister side slot (12CA) disposed therein;

B) a stacker (16) positioned adjacent to the canister (12), the stacker (16) comprises a stacker cylinder (16A) having a movable stacker cylinder piston (16AA) attached at a front distal end to a rear distal end of a horizontal stacker cylinder piston plate (16AAA) which inserts and retracts through the canister side slot (12CA), the stacker (16) further comprises a stacker power means (16B), the stacker power means (16B) comprises a stacker power means inlet (16BA) and a stacker power means egress (16BB) attached to and in communication with a lower and an upper end, respectively, of the stacker cylinder (16A), the stacker power means (16B) further comprises a stacker power means connector (16BC) which is powered by hydraulic or pneumatic means, the stacker power means (16B) is connected to and controlled by a stacker controller (16C);

C) a lift (18) positioned directly below the canister (12), the lift (18) comprises a lift cylinder (18A) having a lift cylinder piston (18AA) movably positioned therein, the lift cylinder piston (18AA) comprising a horizontal lift cylinder piston plate (18AAA) securely attached to a top distal end thereof, the lift (18) further comprises a lift power means (18B), the lift power means (18B) comprises a lift power means inlet (18BA) having a lift valve (18F) and a lift power means egress (18BB) attached to and in communication with lower and upper ends, respectively, of the lift cylinder (18A), the lift power means (18B) further comprises a lift power means connector (18BC) which is powered by hydraulic or pneumatic means, the lift power means (18B) is connected to and controlled by a lift second controller (18D) which is electrically connected to a lift first controller (18C) which is electrically connected to the stacker controller (16C), the lift power means (18B) further comprises a lift third controller (18E) attached thereto, the lift valve (18F) is electrically connected to the lift first controller (18C);

D) an upper conveyor (20) horizontally positioned in alignment with the canister top (12T), the upper conveyor (20) comprises a rotatable upper conveyor belt (20A) upon which incoming tortillas (28C) are placed;

E) a lower conveyor (22) positioned between the lift (18) and the canister (12), the lower conveyor (22) comprises a lower conveyor left belt (22AL) and a lower conveyor right belt (22AR) synchronically rotated, the space between the lower conveyor left belt (22AL) and the lower conveyor right belt (22AR) is slightly larger than the diameter of the lift cylinder piston plate (18AAA) which deposits a tortilla first stack (28A) on the lower conveyor left belt (22AL) and the lower conveyor right belt (22AR);

F) a photoelectric eye (24) electrically connected to the lift third controller (18E); and G) a counter (26) electrically connected to the photoelectric eye (24).

2. The tortilla counter-stacker (10) as described in claim 1, wherein the canister (12) further comprises a canister sleeve (12A) securely mounted therein, the canister sleeve (12A) comprises a diameter slightly bigger than a diameter of an incoming tortilla (28C).

3. The tortilla counter-stacker (10) as described in claim 1, wherein the canister top (12T) further comprises a canister top shroud (12TA) having an opening facing the upper conveyor (20), the canister top shroud (12TA) functions to facilitate directing the incoming tortilla (28C) into the canister (12) which rest upon the lift cylinder piston plate (18AAA) forming a tortilla second stack (28B).

4. The tortilla counter-stacker (10) as described in claim 3, wherein the canister top shroud (12TA) comprises a canister top shroud left flair (12TAL) and a canister top shroud right flair (12TAR) positioned at opposite ends, the canister top shroud left flair (12TAL) and the canister top shroud right flair (12TAR) function to facilitate directing the incoming tortilla (28C) into the canister (12).

5. The tortilla counter-stacker (10) as described in claim 1, wherein the canister bottom (12B) comprises a canister bottom extender (12BA) positioned at an opposite side to the movable direction of the lower conveyor (22), the canister bottom extender (12BA) functions to facilitate directing the tortilla first stack (28A) onto the lower conveyor left belt (22AL) and the lower conveyor right belt (22AR).

6. The tortilla counter-stacker (10) as described in claim 1, wherein the canister bottom (12B) further comprises canister bottom vent (12BB) extending upwardly therefrom, the canister bottom vent (12BB) functions to facilitate directing the tortilla first stack (28A) onto the lower conveyor left belt (22AL) and the lower conveyor right belt (22AR).

7. The tortilla counter-stacker (10) as described in claim 1 further comprises a vibrator (14) attached to the canister side (12C) by a vibrator arm (14A), the vibrator (14) functions to jiggle the canister (12) directing the incoming tortilla (28C) to properly position on top of a tortilla second stack (28B).

8. The tortilla counter-stacker (10) as described in claim 1, wherein the canister sleeve (12A) comprises a conical configuration narrowing toward a bottom thereof.

* * * * *